United States Patent Office

3,318,420
Patented May 9, 1967

3,318,420
SPOT TYPE DISC BRAKES
Richard Albert Adams, West Rainton, England, assignor to Dunlop Rubber Company Limited, London, England, a corporation of Great Britain
Filed Nov. 12, 1964, Ser. No. 410,517
Claims priority, application Great Britain, Nov. 12, 1963, 44,543/63
7 Claims. (Cl. 188—73)

This invention relates to disc brakes, and particularly to disc brakes of the kind in which the friction pads are movable into engagement with the braking surfaces of the disc by means of a pair of pressure plates pivotally mounted on a fixed support and disposed chordally with respect to the disc. In brakes of this kind the pressure plates are normally each attached at one end to a fixed pivot, and a tie member and associated operating mechanism is provided to draw the other ends of the pressure plates towards one another to apply the brake.

One object of the present invention is to provide a brake of the kind described with self-energizing braking characteristics.

According to the invention, a brake assembly comprises a disc brake of the kind described together with an operating mechanism for manual or pedal operation of the brake, the brake comprising a pressure plate pivotally mounted at one end on a rigid support and a friction element associated with the pressure plate, the association between the friction element and the pressure plate or between the pressure plate and the support being such that when the brake is operated the friction element is moved by the pressure plate into engagement with the disc, the friction element then being moved relative to the support by the drag resulting from frictional engagement of the element with the rotating disc, means being provided for guiding the friction element or the pressure plate obliquely towards the disc to provide an increased application force between the friction element and the disc, and the operating mechanism having a high mechanical advantage and high frictional losses such that the increased reaction force is balanced by reactions set up in the operating mechanism so that the brake is more controllable and has a closer relationship between applying effort and braking action.

According to the invention also, a disc brake of the kind described comprises a pressure plate mounted at one end on a rigid support by means of a pivot comprising a pivot member and an associated guide member, one of said members being attached to the support and the other member being attached to the pressure plate, the guide member being inclined relative to the disc so that when the pressure plate is moved in the direction of forward rotation of the disc adjacent the pressure plate the end of the pressure plate adjacent the pivot is moved towards the disc.

In one arrangement according to the invention, each pressure plate is provided at one end with a pivot pin, the pin being fixed to the pressure plate and slidably mounted at its ends in parallel guides formed in the support. The guides each consist of a slot for guiding the pin, the slot being constructed with one face at an angle of about 45° to the adjacent braking surface of the disc and directed towards the disc in the normal forward direction of rotation thereof. During braking the pressure plates are dragged tangentially in either direction of the disc and the pivot pins slide along their respective guide faces to move the associated ends of the pressure plates towards the disc. A restoring spring is provided to move the pins back along the slots on release of the brake.

In a preferred arrangement the guide faces consist of V-shaped slots which are arranged so that the pins are biased towards the disc in either direction of rotation of the disc, thus providing self-energizing braking characteristics both in the forward and in the reverse directions of movement of the associated vehicle.

In a further alternative arrangement, the pressure plate may be supported on a fixed pivot and the friction element may be supported so as to be capable of limited movement on the pressure plate and being constrained to move obliquely towards the disc, when subjected to the drag of the rotating disc during braking, by an inclined guide formed on the pressure plate.

One embodiment of the invention will now be described, by way of example, with reference to the accompanying drawings in which.

Figure 1:
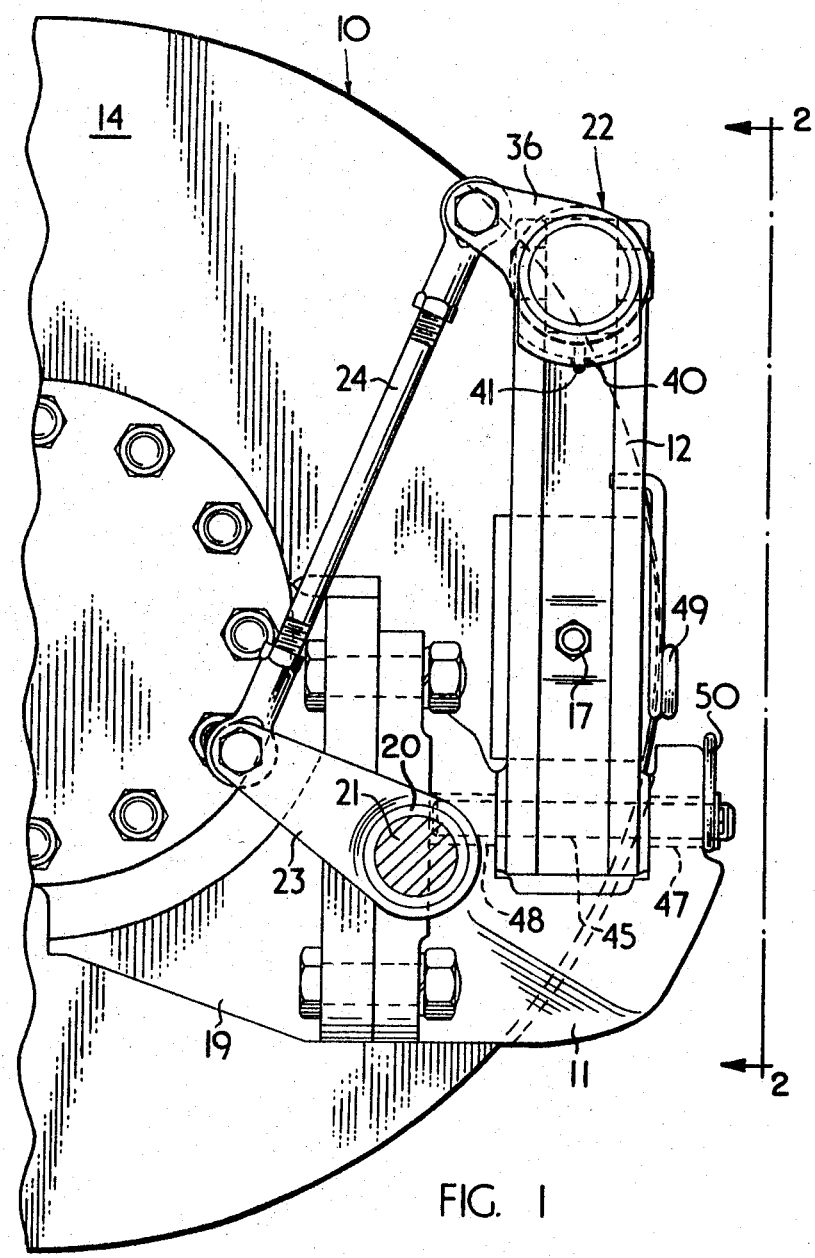
FIGURE 1 is a fragmentary axial end view of a disc brake in accordance with the invention.
Figure 2:
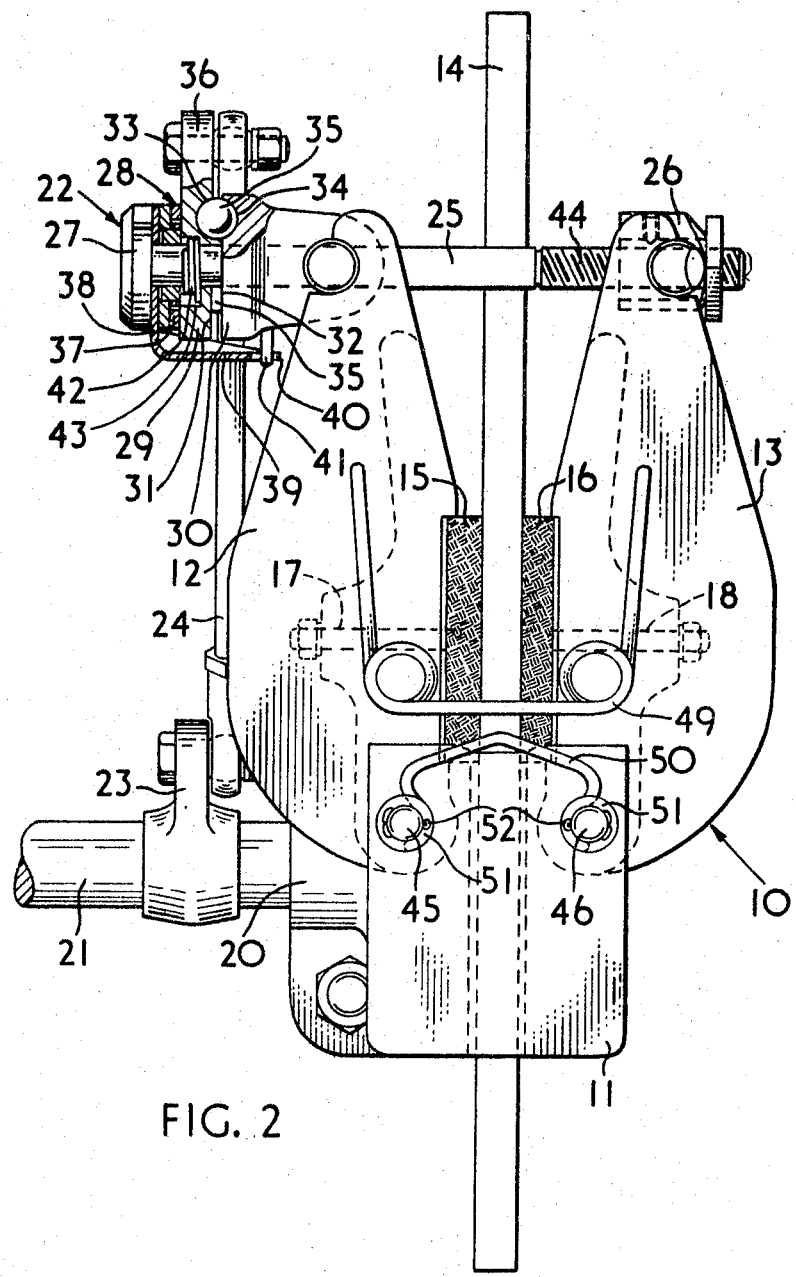
FIGURE 2 is a view, looking in the direction of the arrows 2—2 in FIG. 1 and with a portion of the applying mechanism broken away to illustrate its internal structure.

A disc brake 10 for use on a tractor comprises a non-rotatable caliper-type support 11 for a pair of pressure plates 12 and 13. The pressure plates are pivotally mounted on the support by means to be described, and extend chordally with respect to the disc 14, one on each side of the disc. Friction elements 15, 16 which are each in the form of a friction pad bonded to a backing plate are fixed respectively to the plates 12, 13 by nut and bolt assemblies 17, 18 (FIGS. 1, 2).

The support 11 is mounted on a bracket 19 (FIG. 1) secured to the axle casing of the tractor, and carries a bearing 20 which supports the end of a shaft 21. The shaft 21 is rotatable by a linkage connected to the driver's brake pedal or lever to operate the brake, and is connected to a brake-applying mechanism 22 by a lever 23 fixed to the shaft 21 and a pull rod 24.

The brake-applying mechanism 22 is situated at the ends of the pressure plates remote from the support 11. The mechanism 22 consists of a tie-rod 25 passing through axially-aligned holes adjacent the ends of both pressure plates, one end of the tie-rod being in screw-threaded engagement with a trunnion block 26 engaging the pressure plate 13 and the other end of the rod having a head 27 which is engaged by an expander device 28 positioned between the other pressure plate 12 and the head 27.

The expander device 28 consists of a pair of annular members 29, 30 coaxially aligned around the tie-rod and having confronting faces 31, 32 which are each provided with three ramped recesses 33, 34, respectively, the recesses of the respective members being located opposite one another, and three balls 35 being located in the spaces between the opposed recesses. The member 30 also constitutes a trunnion block which engages the pressure plate 12. A lever 36 is integral with the member 29 and is connected via the brake operating linkage described above to the driver's brake pedal or lever (FIG. 1). A thrust bearing 37 is provided between the member 29 and the head 27 formed on the tie-rod so that the member 29 can be rotated relative to the tie-rod and to the member 30. A plate 38 is fitted beneath the head 27 and is provided with a bent-over portion 39 which has a slot 40 the sides of which engage a peg 41 fitted in the member 30 to prevent any tendency for the rod 27 to rotate during application of the brake. When the expander device is operated by rotating the lever 36 the consequent relative rotation of the annular members 29, 30 causes the balls 35 to ride up the ramps of their recesses and thus to exert a force between the head 27 of the tie-rod and the adjacent pressure plate 12. This force draws the ends of the pressure plates towards one another and thus acts to apply the brake.

When friction pad wear occurs, the resulting play is automatically taken up by a mechanism which comprises a coil spring 42 wrapped tightly around the rod 25 and engageable at one end with the sides of a radial slot 43 in the member 29, the slot 43 being wider than the thickness of the coil spring 42. A screw-thread 44 is formed on the rod 25 and engages a corresponding internal screw-thread in a bush secured in the trunnion block 26. In operation, the coil spring 42 does not engage the side of the slot 43 until friction pad wear is sufficient to cause the lever 36 to rotate through a certain angle corresponding to the width of the slot 43.

The coil spring 42 is wound in such a direction that when the lever 36 is turned in the counterclockwise direction as seen in FIGURE 1, to apply the brake, and the side of the slot 43 engages the end of the spring, the coil spring 42 slips around the rod 25 and does not tend to rotate the rod. When the lever 36 moves in the clockwise direction to release the brake the opposite side of the slot then engages the spring 42, which then tends to tighten on the rod and to turn it so as to take up any wear which has occurred in the friction pads.

Figure 3:
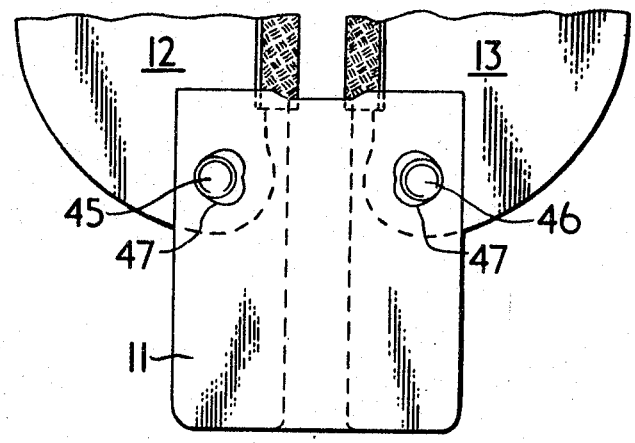
FIGURE 3 is a fragmentary view of the support structure for the friction elements and pressure plates, this structure being shown separate from the rest of the brake.

The pressure plates 12, 13 are mounted on the support by means of pivot pins 45, 46 which are fixed in the pressure plates and extend at right angles to the tie-rod and parallel to the plane of the disc. The ends of each pin are engaged in a pair of aligned V-shaped slots 47, 48 (see FIGURES 2 and 3), formed in the support and arranged so that the slots form guides for the pivot pins which tend to bias the pins and therefore the pressure plates and friction pads axially towards the disc when application of the brake causes the pressure plates to be moved tangentially with the disc either in the forward or in the reverse direction of rotation of the disc.

A retraction spring 49 is provided to move the pressure plates apart on release of the brake to disengage the friction pads from the disc, and a second U-shaped retraction spring 50 is provided to urge the pivot pins 45, 46 axially away from the disc, the ends of the spring 50 engaging the pins 45, 46 so as to tend to force the pins apart. The spring 50 is retained by washers 51 and split pins 52 fittted to the pins 45, 46.

When the brake is operated the drag of the rotating disc on the friction pads tends to move the pressure plates in the direction of rotation of the disc. The consequent movement of the pins in the slots 47, 48 causes the pins to be forced by the faces of the slots obliquely towards the disc, thus enhancing the pressure exerted on the friction pads by the brake-applying mechanism.

The additional thrust applied by the pivotal mounting described above is accompanied by an increased reaction on the tie-rod 25 tending to oppose the action of the brake-applying mechanism, and this tends to increase the reaction at the driver's brake pedal or lever. On a tractor, however, the mechanical linkage between the brake pedal or lever and the brake-applying mechanism, and the brake-applying mechanism itself, both normally have a high mechanical advantage and high frictional losses and it has been discovered that in such an installation the reaction is absorbed by the linkage and in the brake-applying mechanism so that little or no increase in "pedal reaction" occurs. In this application therefore, the invention provides a useful self-energizing effect which improves the overall efficiency of the system.

In the preferred embodiment described above, the V-shaped slots each provide a pair of inclined guides which give a self-energizing effect in both directions of rotation of the disc. In an alternative construction, however, the slots may be single inclined slots which only provide a self-energizing effect when the disc is rotating in its normal direction for forward movement of the associated vehicle.

In the embodiment described the slots are formed directly in the caliper, but in a further alternative construction the slots may be formed in bushings fitted into sockets in the caliper.

Although the present invention has been illustrated and described in connection with a few selected example embodiments it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents thereof.

Having now described my invention, what I claim is:

1. In a brake assembly having an operating system of both manual and pedal type actuation, the structure comprising: a high mechanical advantage leverage actuator including two relatively movable members which provide angular movement therebetween and providing frictional forces for resisting such movement, camming means disposed between said relatively movable members, a pressure plate having a pivotal mounting at one end thereof and connected to said leverage actuator at the opposite end thereof, a rigid support providing pivotal suspension for said pressure plate, a friction element combined with said pressure plate to be movable thereby in a brake-applying direction responsively to relative movement between said pressure plate and said support, said friction element being movable relatively to said support responsively to wiping engagement force between said friction element and its opposed braking surface, self-energizing means for biasing said friction element and pressure plate in an oblique brake-applying direction to provide an increased braking engagement force between said friction element and its opposed friction surface, said relatively movable members adapted to generate internal friction losses which are opposed to and effectively nullify through said leverage actuator the increased reaction force established by said self-energizing means against input effort by the operator.

2. A disc brake in accordance with claim 1 wherein said pressure plate includes a pivot pin which serves as a cam follower in combination with said self-energizing means whereby as said pressure plate is drawn by frictional engagement in a transverse direction of brake-appling movement, said pin effects further self-energizing wedging action for applying said member in a brake-applying direction.

3. The structure in accordance with claim 2 wherein said rigid support includes surfaces which are V-shaped in construction and wherein said pivot pin is cammed in a brake-applying direction by relative movement of said pressure plate in either of opposite directions with respect to said support.

4. The structure in accordance with claim 3 wherein said pivot pin projects laterally from said pressure plate to extend into combination with the V-shaped guide means associated with said pressure plate.

5. A disc brake structure in accordance with claim 4 including a retraction spring operatively connected with said pressure plate to urge it in a normally retracted position.

6. The disc brake structure in accordance with claim 4 including resilient means for biasing said pin outwardly along the coacting V-shaped surfaces as the brake is released.

7. The disc brake structure in accordance with claim 6 wherein said resilient means is of U-shaped construction with an end thereof operatively combined with said pivot pin.

References Cited by the Examiner

UNITED STATES PATENTS

| | | | |
|---|---|---|---|
| 2,663,384 | 12/1953 | Chamberlain | 188—73 |
| 3,185,259 | 5/1965 | Chousings | 188—73 |
| 3,207,267 | 9/1965 | Beuchle et al. | 188—73 |

FOREIGN PATENTS 1,245,996  10/1960  France.

MILTON BUCHLER, *Primary Examiner.*

FERGUS S. MIDDLETON, *Examiner.*

G. E. A. HALVOSA, *Assistant Examiner.*